(12) United States Patent  
Maeda et al.

(10) Patent No.: US 6,500,579 B1  
(45) Date of Patent: Dec. 31, 2002

(54) FUEL CELL STRUCTURE

(75) Inventors: Hideo Maeda, Tokyo (JP); Hisatoshi Fukumoto, Tokyo (JP); Kouji Hamano, Tokyo (JP); Kenro Mituda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 160 days.

(21) Appl. No.: 09/631,989

(22) Filed: Aug. 3, 2000

(30) Foreign Application Priority Data

Aug. 19, 1999 (JP) .......................... 11-232505  
Aug. 19, 1999 (JP) .......................... 11-232506  
Sep. 3, 1999 (JP) .......................... 11-249664

(51) Int. Cl.[7] .............................................. H01M 2/00  
(52) U.S. Cl. .............................. 429/34; 429/30; 429/12  
(58) Field of Search .............................. 429/34, 30, 12

(56) References Cited

U.S. PATENT DOCUMENTS 4,686,159 A    8/1987   Miyoshi ...................... 429/39

FOREIGN PATENT DOCUMENTS

JP           62-40169         2/1987  
JP           2-306545    *   12/1990  
JP           3-205763         9/1991

* cited by examiner

Primary Examiner—Laura Weiner  
(74) Attorney, Agent, or Firm—Leydig, Voit & Mayer, Ltd.

(57) ABSTRACT

A fuel cell including a unit cell and a separator panel alternatingly stacked on one another. The unit cell includes an electrolyte membrane sandwiched between a fuel electrode and an oxidant electrode. The separator panel includes parallel fuel flow paths extending from a fluid supply port to a fluid discharge port for supplying fluid fuel to the fuel electrode and parallel oxidant flow paths extending from a fluid supply port to a fluid discharge port for supplying oxidant fluid to the oxidant electrode. At least the oxidant flow paths include groups of parallel flow paths, which extend back and forth within divided regions of the main surface of the separator panel. The oxidant flow paths may include groups of parallel flow paths, positions along the groups of the parallel flow paths at equal distance from the respective fluid supply port being distributed substantially evenly over the main surface of the separator panel. Also, groups of parallel flow paths extend back and forth within a region defined by a projection of the divided regions through which the oxidant flow paths extend. The ridge width of ridges defined between grooves within the parallel flow path group is smaller than the ridge width of the ridges defined between the grooves of the parallel flow path group adjacent to each other.

4 Claims, 12 Drawing Sheets

FUEL CELL STRUCTURE

BACKGROUND OF THE INVENTION

This invention relates to a fuel cell which is used in an electric vehicle and the like and a manufacturing method therefor. While this invention will be described in relation to a solid-state high polymer type fuel cell, it is also applicable to a phosphoric acid fuel cell.

As is well known, the fuel cell is an apparatus having a pair of electrodes and an electrolyte sandwiched therebetween, a fuel is being supplied to one of the electrodes and an oxidant being supplied to the other of the electrodes thereby achieving an electrochemical reaction between the fuel and the oxidant within the cell to convert chemical energy directly into electrical energy.

According to the kind of the electrolyte, fuel cells are classified as including a so-called solid polymer fuel cell in which a solid polymer electrolyte membrane is used as an electrolyte, and a phosphoric acid fuel cell in which phosphoric acid is used. Recently, a solid polymer fuel cell received attention as a fuel cell which can output a nigh power. When hydrogen gas is supplied to a fuel electrode and oxygen gas is supplied to an oxidant electrode, for example, to produce an electric current in an external circuit, the following reactions as shown in the following chemical reaction formulae (1) and (2) occurs:

anode reaction: $H_2 \rightarrow 2h^+ + 2e$ (1)

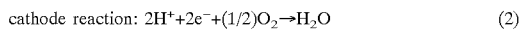
cathode reaction: $2H^+ + 2e^- + (1/2)O_2 \rightarrow H_2O$ (2)

When these reactions occur oxygen becomes protons on the fuel cell electrode and move together with water through the electrolyte up to the oxidant electrode, where they react with oxygen on the oxidant electrode to generate water. Therefore, in order to operate the above fuel cell, it is necessary to supply and discharge the reaction gas and to take out the electric current Some examples of the separator panel for taking out the electric current from the fuel cell and for efficiently circulating the gas and water can be found in Japanese Patent Laid-Open Nos. 58-161270, 58-161269 and 3-206763.

FIG. 15 is a sectional View for explaining the overall structure of a unit cell constituting the fuel cell disclosed in Japanese Patent Laid-Open No. 3-206763, in which reference numeral 1 and 2 designate electrically conductive separator panels, 3 is an oxidant electrode, 4 is a fuel electrode and 5 is an electrolyte member using a proton-conductive solid polymer, the electrolyte member 5, the oxidant electrode 3 and the fuel cell 4 constitute a unit cell 6.

FIG. 16 is an explanatory view showing the top surface of the separator panel of the fuel cell shown in FIG. 15, the explanation thereof will be made in conjunction with FIG. 15.

That is, the reference numeral 20 is a major surface of the separator panel 1, 21 is an electrode support portion of the separator panel 1 for supporting the electrode 3, 22 is an oxidant supply port provided in the separator panel 1 for supplying air as the oxidant, 23 is an oxidant discharge port for discharging air, 24 is a fuel supply port for supplying the fuel therethrough and 25 is a fuel discharge port for discharging the fuel.

In the separator panels 1 and 2, an oxidant flow path 10 and a fuel flow path 11 are defined by grooves cut into the main surface 20 and a space surrounded by the electrodes 3 and 4.

The operation of the fuel cell will now be described in conjunction with FIGS. 15 and 16. Oxygen supplied from the oxidant supply port 22 of the separator panel 1 is supplied to the oxidant electrode 3 through a plurality of parallel oxidant flow path 10 and the fuel is supplied to the fuel electrode 4 through the fuel gas flow path 11 in a similar manner to the flow of the oxidant. At this time, since the oxidant electrode 3 and the fuel electrode 4 are electrically connected at the outside, the foregoing chemical reaction formula (2) occurs on the side of the oxidant electrode 3 and the reduced reaction gas and water are carried through the oxidant gas flow path 11 and are discharged from the oxidant discharge port 23. On the side of the fuel electrode 4, the reaction of the above reaction formula (1) occurs and the reduced reaction gas is similarly discharged from the fuel discharge port 25 through the fuel gas flow path 11. The electrons obtained by this reaction flow from the electrodes 3 and 4 through the electrode support portions 21 and through the separator panels 1 and 2.

The oxidant flow paths 10 are formed on one of the surfaces in a serpentine manner in cross section so as to define a plurality of parallel grooves. Also, the fuel gas flow paths 11 are also a plurality of grooves similar to the oxidant flow paths 10.

In such a fuel cell, gas diffusion necessary for the reaction is promoted and the water generated at the oxidant electrode is efficiently discharged by making the boundary layer thin by increasing the gas flow speed and by making the gas flow path long by forming it into a serpentine shape.

It has also been proposed that the region be completely divided to define serpentine flow paths as shown in FIG. 17, which is a perspective view of the separator panel disclosed in Japanese patent Laid-Open No. 62-40169. In the figure, the reference numeral 7 is a separator panel, 8 and 8a are grooves, 9 and 9a are ribs. According to this measure, an inlet and an outlet for a single fluid occupy substantially the complete length of one side of the separator panel and it is difficult to provide for another fluid.

Also, a flow path in which a parallel flow path is simply folded and returned is shown in FIG. 18 which is a perspective view of a separator panel disclosed in WO96/20510. In the figure, the reference numeral 71 is an airflow path, 72 is a fuel supply port, 73 is an air supply port, 74 is an air discharge port and 75 is a fuel discharge port In the conventional separator panels, the reaction is promoted at the region where the concentration of the fluid flowing through the flow path is high and the current density is increased within that region, making the current density over the entire separator panel non-uniform. However, this non-uniform current density is not considered at all, so that the effective reaction area is decreased, resulting in lowered properties.

In the above conventional fuel cell, the voltage generated by one unit cell is not greater than 1V and it is necessary to stack more than 100 unit cells and separator panels as disclosed in Japanese Patent Laid-Open No. 4-121914 to obtain a voltage of equal to or more than 100V which is practically necessary.

However, stacking more than 100 unit cells and separator panels at one time is not good in work efficiency and not only the precision maintenance of the alignment of the stacked elements is difficult, but also they are displaced due to vibration or the like during the operation and, in worst case gas leakage may occur due to the displacement of the gas supply port or gas discharge port.

While a fuel cell having a conventional separator panel is arranged to increase the gas flow speed to discharge the formed water as discussed above, the gas leaks between a group of the flow paths and a second group of bent flow paths next to the first group of the flow paths.

Accordingly, an object of the present invention is to provide a fuel cell which has a uniform reaction distribution over the separator panel and an improved performance.

Another object of the present invention is to provide a method for manufacturing a fuel cell in which a precisely assembled fuel cell stack can be manufactured at low cost and high efficiency.

Another object of the present invention is to provide a fuel cell that has a stable mechanical configuration during operation.

A further of object of the present invention is to provide a fuel cell in which the gas leakage can be prevented and which can be mass-produced and is capable of generating a high voltage output.

SUMMARY OF THE INVENTION

With the above object in view the fuel cell of the present invention comprises a unit cell and a separator panel alternatingly stacked on one another. The unit cell includes an electrolyte membrane sandwiched between a fuel electrode and an oxidant electrode. The separator panel includes a plurality of parallel fuel flow paths extending from a fluid supply port to fluid discharge port for supplying fluid fuel to the fuel electrode and a plurality of parallel oxidant flow paths extending from a fluid supply port to a fluid discharge port for supplying oxidant fluid to the oxidant electrode. At least the plurality of oxidant flow paths comprise a plurality of groups of parallel flow paths, which extend back and forth within divided regions of the main surface of the separator panel.

The plurality of oxidant flow paths may comprise a plurality of groups of parallel flow paths, positions along the plurality of groups of the parallel flow paths at equal distance from the respective fluid supply port thereof being distributed substantially evenly over the main surface of the separator panel.

Also, the separator panel may comprise a plurality of parallel coolant flow path for allowing a coolant to flow therethrough, and the plurality of coolant flow paths may include a plurality of groups of parallel flow paths, which extend back and forth within a region defined by a projection of the divided regions though which the oxidant flow paths extend.

The method for manufacturing a fuel cell of the present invention comprises the steps of preparing a unit cell having an electrolyte membrane sandwiched between a fuel electrode and an oxidant electrode and having a first through hole on an electrode surface, and a separator panel having a plurality of fuel flow paths extending for supplying fluid fuel to the fuel electrode and a plurality of oxidant flow paths for supplying oxidant fluid to the oxidant electrode and having a second through hole on a main surface thereof. Then, the unit cell and the separator panel are stacked one on another to make stacks and an intermediate adapter having a third through hole is inserted into the first and second through holes to hold the stacks into unit blocks. The plurality of unit blocks are stacked and a clamp shaft is inserted into the third through hole of the intermediate adapter of the stacked unit blocks to obtain a stack of the unit blocks, and then the stack of the unit blocks is clamped by the clamp shaft.

The intermediate adapter may be a cylinder having an outer diameter for allowing it to be inserted into the first and second through holes, and the third through hole may have dimensions for allowing the shaft to extend therethrough.

The first and second through holes and the intermediate adapter may have an oval cross-sectional shape.

Also, the fuel cell may comprise a unit cell having an electrolyte membrane sandwiched between the fuel electrode and the oxidant electrode, a separator panel having-formed therein fuel flow paths for supplying fuel fluid to the fuel electrode and oxidant flow paths for supplying oxidant fluid to the oxidant electrode, an intermediate adapter having a through hole therein and inserted into the unit cell and the separator panel to hold them in a stacked relationship to form unit blocks, and a clamp shaft extending through plurality of the unit blocks and clamping them into a stack of unit blocks.

The ridge width of ridges defined between grooves within the parallel flow path group may be smaller than the ridge width of the ridges defined between the grooves of the parallel flow path group adjacent to each other.

The ridge width between the adjacent groups may be increased as the distance from the folded portion increases.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

First Embodiment

The fuel cell of the present invention according to the first embodiment utilizes an alternating stack of a separator panel and a unit cell including an electrolyte membrane sandwiched between a fuel electrode and an oxidant electrode.

The separator panel includes a plurality of parallel fuel flow paths extending from a fluid supply port to fluid discharge port for supplying fluid fuel to the fuel electrode and a plurality of parallel oxidant flow paths extending from a fluid supply port to a fluid discharge port for supplying oxidant fluid to the oxidant electrode, the fuel flow paths being disposed on one surface of the separator panel and the oxidant flow paths being disposed on the other surface of the separator panel and the respective flow paths are being disposed on the separator panels.

At least the plurality of oxidant flow paths of the separator panel comprise a plurality of groups of parallel flow paths, which extend back and forth within divided regions of the main surface of the separator panel and which does not extend as a group of parallel flow paths.

That is, positions along the plurality of groups of the parallel flow paths at equal distance from the respective fluid supply port thereof or the regions in which the same reaction amount is exhibited at the same fluid density is distributed substantially evenly over the main surface of the separator panel, thereby to distribute the reaction.

Figure 4:
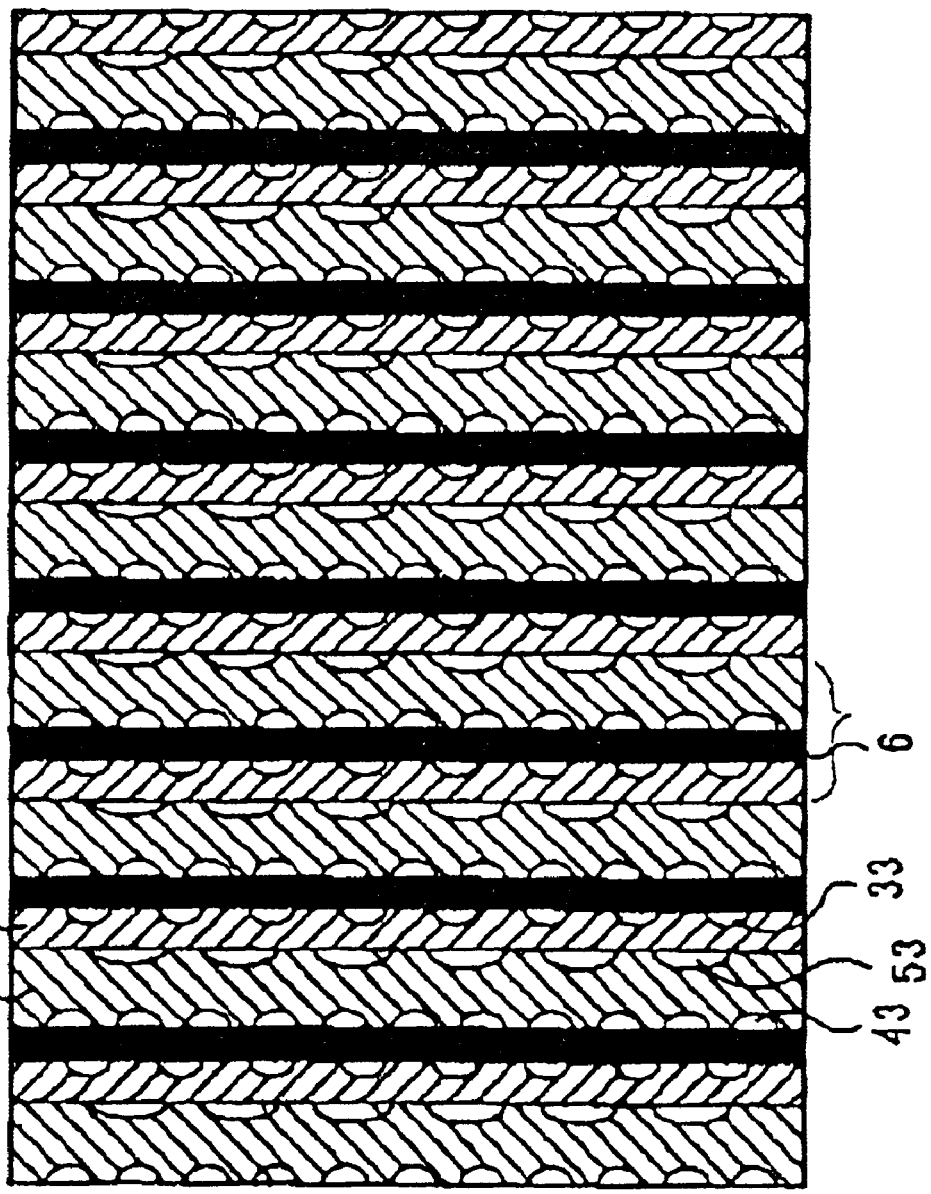
FIG. 4 is a sectional view of the stack of the fuel cell of the first embodiment of the present invention.

FIG. 4 is a sectional view of the stack of the fuel cell of the first embodiment of the present invention, in which 6 is a unit cell, 39 is a separator panel having the fuel flow paths and the coolant flow paths on the respective sides, 40 is a separator panel having formed therein an oxidant flow paths, 33 are oxidant flow paths, 43 are fuel flow paths and 53 are coolant flow paths.

Figure 1:
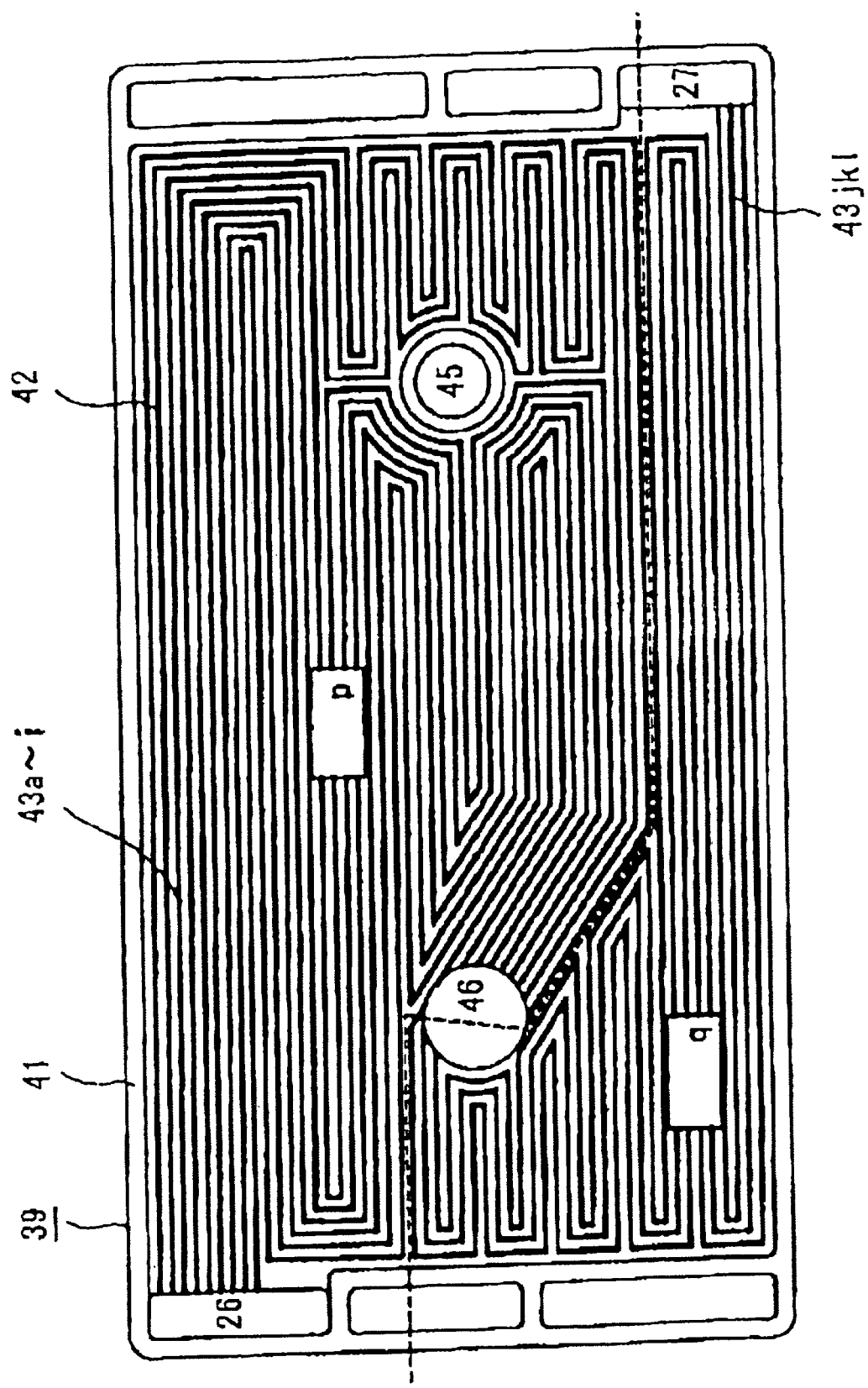
FIG. 1 is a plan view of the separator panel showing the fuel flow paths according to the first embodiment of the present invention.
Figure 2:
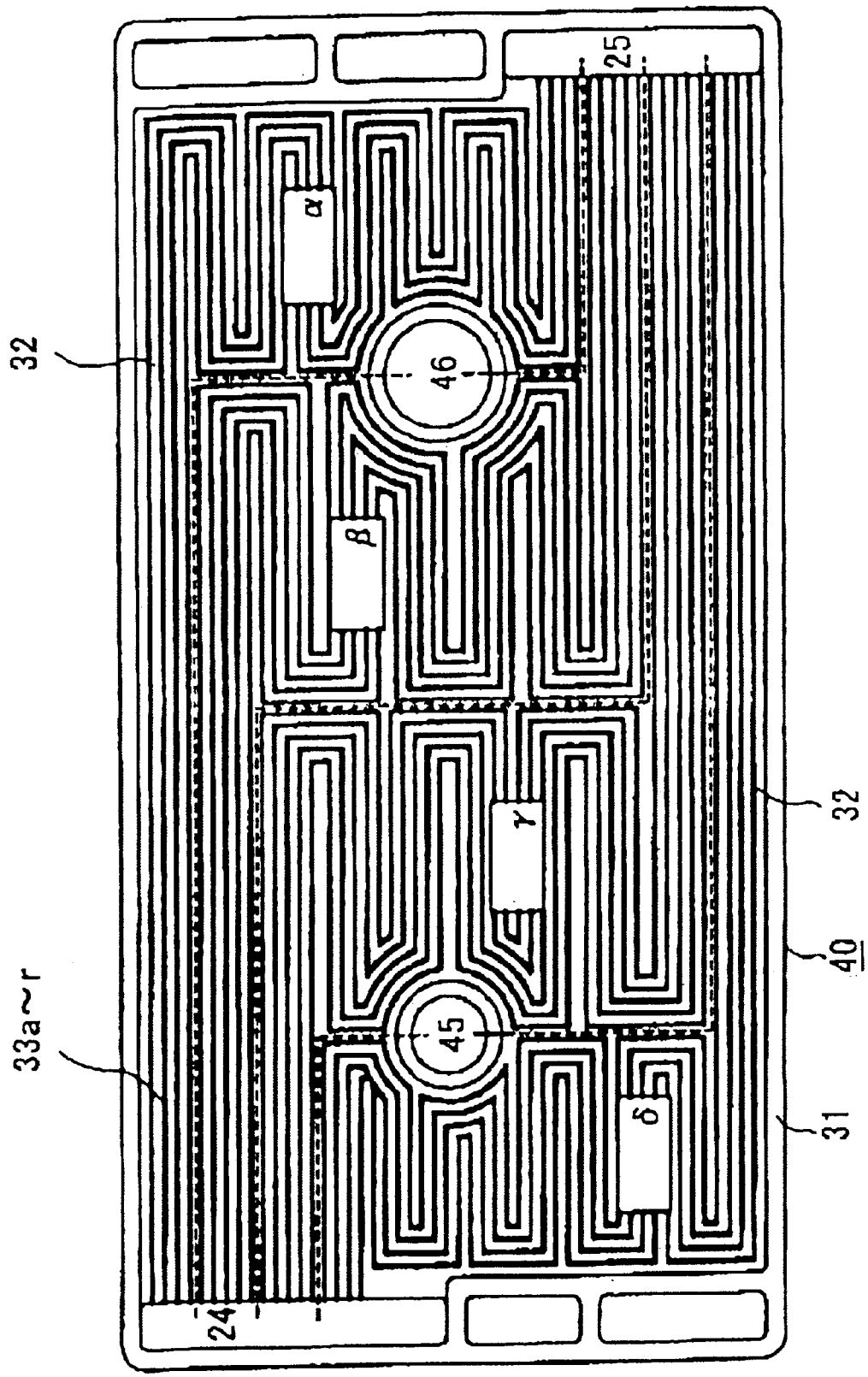
FIG. 2 is a plan view of the separator panel showing the oxidant flow paths according to the first embodiment of the present invention.
Figure 3:
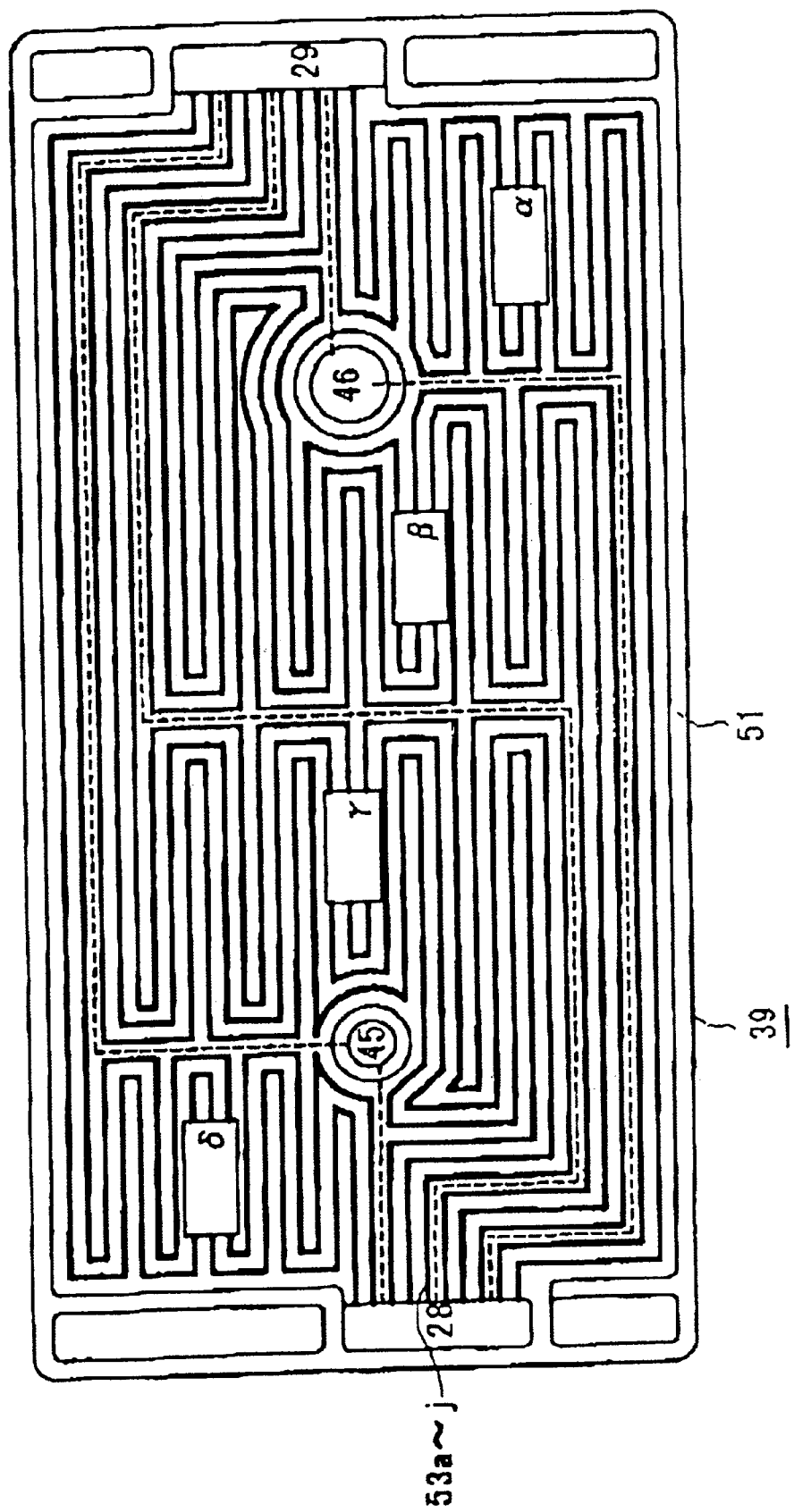
FIG. 3 is a plan view of the separator panel showing the coolant flow paths according to the first embodiment of the present invention.

FIGS. 1, 2 and 3 are plan views of the separator panel used in the above fuel cell for showing the respective fuel flow paths such as an oxidant flow path surface for flowing air therethrough and a coolant flow path surface, FIG. 3 which shows the coolant flow path surface is the opposite surface of the fuel flow path surface of the separator panel. In the figures, 26 is a fuel supply port, 27 is a fuel discharge port, 41 is a fuel flow path side main surface, 42 is a electrode support portion contacting with the anode electrode surface, 43a–43i are parallel fuel flow paths, 45 is a bore for extending a shaft therethrough, 46 is a junction portion of the fluids, 24 is an oxidant supply port, 25 is an oxidant discharge port, 31 is an oxidant flow path main surface, 32 is an electrode support portion, 33a–33r are parallel oxidant flow paths, 28 is a coolant supply port, 29 is a coolant discharge port, 51 is a coolant flow path side main surface and 53a–53j are parallel coolant flow paths.

As shown in FIGS. 1 to 4, in this embodiment of the present invention, the separator panel 39 having the fuel flow paths on one side and the coolant flow path on the other side, the separator panel 40 having the oxidant flow path surface for flowing air for example and the unit cell 6 are alternatingly stacked to constitute the fuel cell. The electrode support portion has a rectangular shape having a horizontal length of 20 cm and a vertical length of 11 cm and includes the supply port and the discharge port of each flow paths on the side end of the electrode support portion. Also, the electrode portion has disposed therein two through holes 45 for passing the clamping shaft and a fuel junction portion 46.

Each flow path is a groove formed by cutting the surface portion of the separator panel, and nine parallel flow paths 43a–43i extend together as the fuel flow paths through a region p extending from the fuel supply port 26 to the junction portion 46 (excluding the portion separated by the shaft 45) and three parallel flow paths 43j–43l which is one-third in number of the above flow paths extend through a region q extending from the junction portion 46 to the discharge port 27 (FIG. 1).

18 parallel low paths 33a–33r extend as the oxidant flow paths from the oxidant supply port 24 to the discharge port 25, and a plurality of groups of parallel flow paths including 4 (43a–43d), 5 (43e–43i), 5 (43j–43n) and 4 (43o–43r) paths extend in a serpentine manner through four regions α, β, γ and δ, respectively, which are substantially the same as the oxidant flow paths (FIG. 2).

10 parallel flow paths 53a–53j extend as the coolant flow paths from the coolant supply port 27 to the discharge port 28, and a plurality of groups of parallel flow paths including 2 (53a, 53b), 3 (53c–53e), 3 (53f–53h) and 2 (53i, 53j) paths extend in a serpentine manner through four regions α, β, γ and δ, respectively, which are substantially the same as the oxidant flow paths (FIG. 2).

The operation will now be described. On the fuel flow path side, the grooves 43a–43i extend together until the junction portion 46 and the grooves 33a–33o of the electrode portion extend together through the region p except for the shunting at the shaft portion, and the after the junction portion 46 three flow paths 43j–43l together flow through the region q after the junction portion 46. Even if the flow path 43c for example is blocked, the current distribution within the region p is covered by the electrode portion controlled by the flow paths 43b and 43d adjacent to each other and substantially no deflection occurs.

On the other hand, on the oxidant flow path side, the current density at the upstream portion of upper 1/3 of the flow path from the oxidant supply port 24 to the oxidant discharge port 25 is greater by 20% than that of the downstream (as measured by a test equipment connected to a unit cell), in this embodiment, since the upstream portion is divided into four, the deviation of the current density is alleviated and the cell voltage at the current density of 500 mA/cm$^2$ was improved by 10 mV as compared to the case where it is not divided.

Further, the separator panel 39 is provided with regions α, γ, γ and δ of the coolant flow paths for flowing the coolant therethrough in a similar manner as above so that they are coincide with the regions α, β, γ and δ of the oxidant flow paths formed in the above-described manner when they are stacked as illustrated in FIG. 4.

In this case, the coolant flow paths also extend through the region divided in a manner similar to the oxidant flow paths, the concentratedly generated heat can be effectively cooled whereby the temperature deviation within the surface by as much as 2° C. and the cell resistance is decreased by as much as 10 mΩcm$^3$ and the property was improved by another 7 mV.

As has been described, in this embodiment, each flow paths cover entire electrode surface, so that even when one of the parallel flow paths is blocked, the current distribution is substantially complemented to become substantially uniformly over the entire surface.

Also, the region in which the current density becomes high is scattered along the region in which the oxidant flow paths are divided.

Also, since the coolant flow paths are divided in a similar manner to the oxidant flow paths, the cooling can be achieved along the region in which the heat generation occurs in accordance with the electrode reaction.

That is, in this embodiment, the heat generating region is scattered in the oxidant flow path region divided by the vertical line, the cooling region is also divided into similar regions to effectively cool the portion at which the heat generation is concentrated, whereby the temperature deviation within the surface can be decreased and the cell resistance can be decreased to improve the characteristics.

Further, since the junction portion 46 is provided in the fuel flow path in this embodiment, some of the flow paths are closed and the fuel immediately before the junction and depleted of the hydrogen is mixed with the fuel from another separator panel at the junction portion 46, whereby the hydrogen density is equalized again so that the fuel at the region q downstream of the junction portion has a current distribution substantially similar to that of another portion.

While the fuel cell of this embodiment has been described as having the separator panel having the coolant flow paths for flowing the coolant therethrough, the invention is not limited to the use of a separator panel provided with the coolant flow paths.

Also, while a thermoplastic resin containing carbon is used for molding in this embodiment, similar advantage in improvements in easy molding can be obtained with a thermosetting resin such as phenol resin.

Second Embodiment

Figure 5:
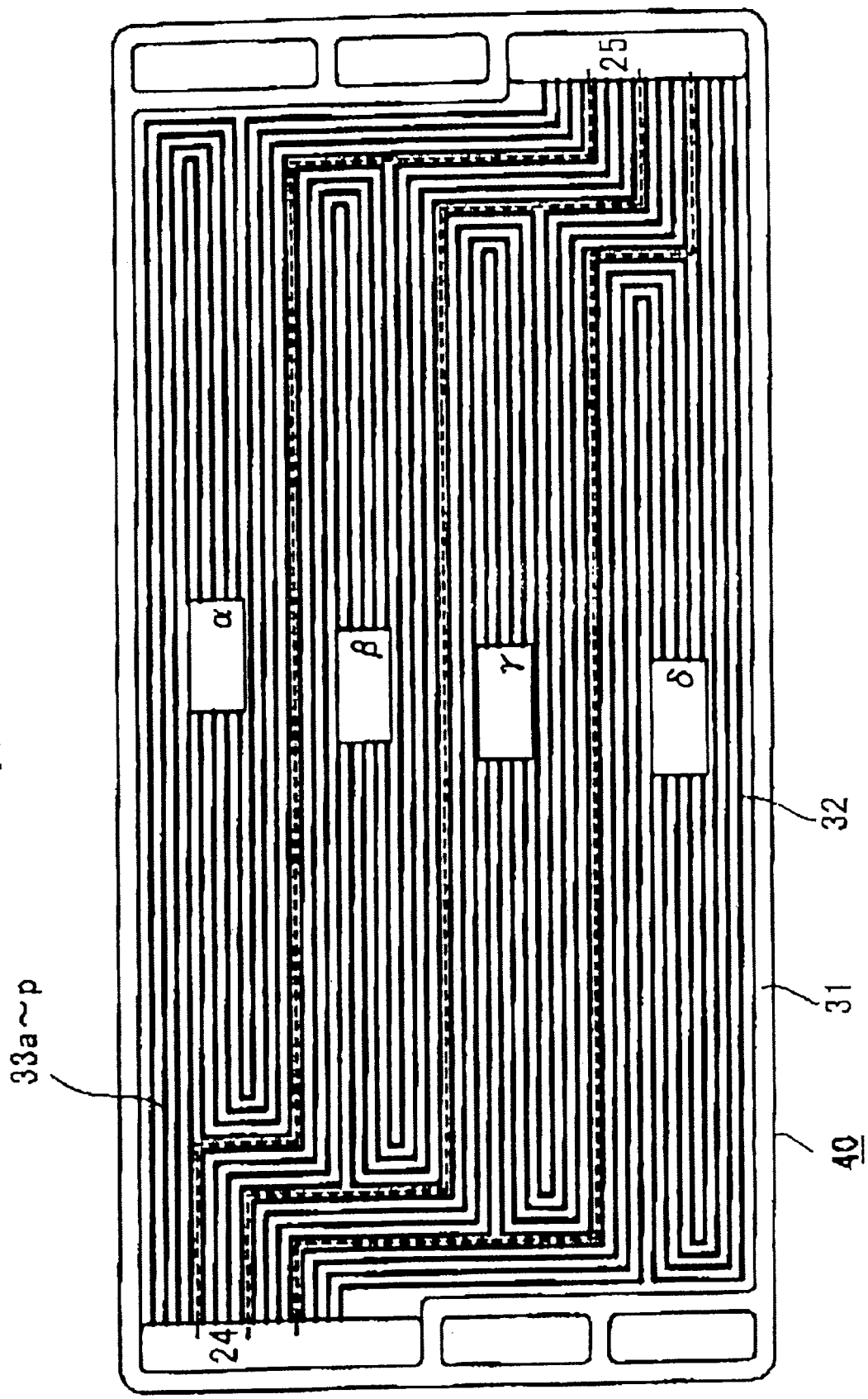
FIG. 5 is a plan view of the separator panel showing the oxidant flow paths according to the second embodiment of the present invention.

FIG. 5 is a plan view of the separator panel according to the second embodiment of the present invention showing the surface 31 having the oxidant flow paths therein. The electrode support portion has a rectangular shape having a horizontal length of 20 cm and a vertical length of 11 cm and includes the supply port and the discharge port of each flow paths on the side end of the electrode support portion, but there is provided no through hole within the electrode support portion 32.

It is seen that 16 parallel flow paths 33a–33p extend as the oxidant flow paths from the oxidant supply port 24 to the discharge port 25, and a plurality of groups of parallel flow paths including 4 paths (33a–33d, 33e–33h, 33i–33l, 33m–33p) extend in a serpentine manner through four regions α, β, γ and δ, respectively, formed by dividing the electrode support portion along horizontal lines.

Although the fuel flow path grooves are not illustrated, FIG. 1 illustrates 8 parallel grooves extending in a serpentine manner throughout the entire region from the fuel supply port 26 to the discharge port 27. While the coolant flow path grooves are not illustrated, FIG. 3 illustrates 12 parallel flow paths extending from the coolant supply port 28 to the discharge port 29, each of four regions α, β, γ and δ similar to the oxidant flow paths has formed therein 3 grooves.

The operation is similar to that of the first embodiment, but this embodiment is different in that the heat generating region is distributed among the oxidant flow path regions divided by the horizontal lines, the cooling region is distributed among the similar regions, whereby the portion at which the heat generation is concentrated can be effectively cooled, to decrease the temperature difference within the surface and the cell resistance, thereby improving the characteristics.

In the forgoing embodiments, the flow paths are explained as being extended through the respective regions of the separator panel in a serpentine manner, so that the reaction distribution may be suitably adjusted by adjusting the direction of progress of the winding or the like.

Third Embodiment

Figure 6:
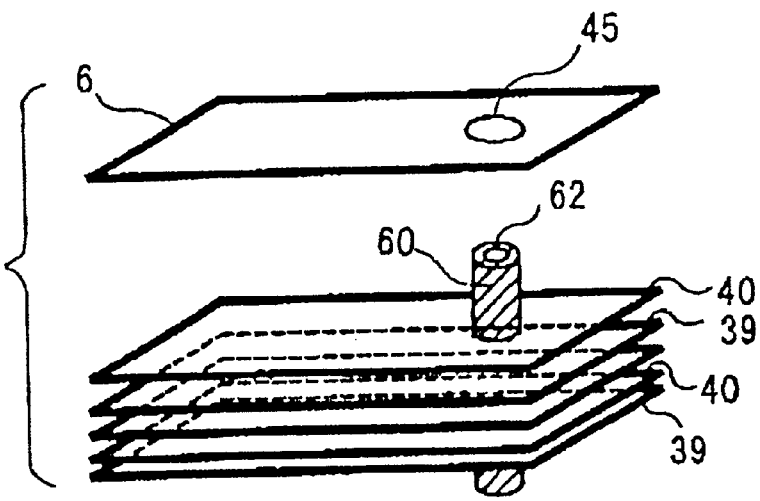
FIG. 6 is a perspective view showing one step of manufacturing the fuel cell of the present invention, in which the unit cells and the separator panels are stacked to define a unit block.
Figure 7:
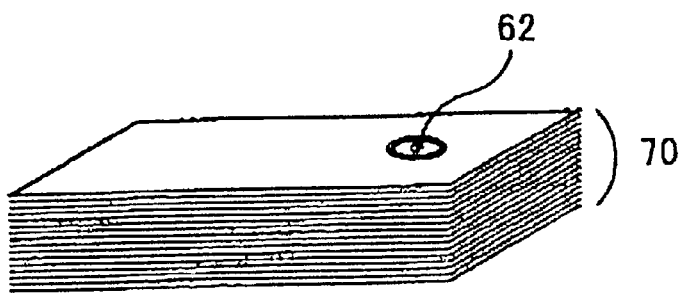
FIG. 7 is a perspective view showing a completed unit block.
Figure 8:
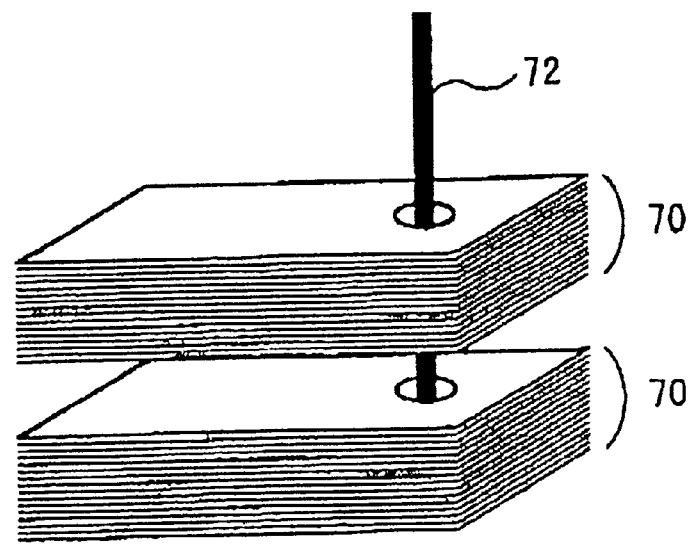
FIG. 8 is a perspective view showing the unit blocks stacked using the clamp shaft.

FIGS. 6 to 8 are perspective views for illustrating steps of manufacturing the fuel cell of the present invention, in which the reference numeral 6 is a unit cell, 39 is a separator panel having formed therein fuel flow paths and coolant flow paths, 40 is a separator panel in which oxidant flow paths are formed, 45 are through holes provided in the unit cell 6. Similar through holes 45 (a first and a second through hole) are provided in the separator panels 39 and 40. The through holes 45 are aligned so that each fluid can be efficienty supplied to the respective electrodes of the unit cell. 72 is a clamp shaft for clamping the stacked unit blocks, 60 is an intermediate adapter having a bore or a through hole (a third through hole) 62. 70 are unit blocks each formed by stacking several unit cells and the separator panels and with an intermediate adapter 60 inserted into the through holes 45 of the unit cells and the separator panels.

That is, the unit cell 6 and the separator panels 39 and 40 each having an effective area of 200 $cm^2$ are provided at the corresponding similar positions with the through holes 45 having a diameter of 13 mm. These cell and the panels are placed over the intermediate adapter 60 having an outer diameter of 13 mm, an inner diameter of 10 mm and a length of 40 mm (FIG. 6) to form a unit block 70 (FIG. 7). Then, the clamp shaft 72 having a diameter of 10 mm is inserted into the through hole 62 of each of the unit blocks 70 to form a stack of a plurality of unit blocks 70 (FIG. 8). Then, the stack of the unit blocks 70 is clamped by using the clamp shaft 72 to obtain a fuel cell. In the figures, the clamping fittings, the current collectors and the like of the completed fuel cell stack are omitted and not illustrated.

The unit block 70 of ten stacked. unit cells manufactured according to the above-described fuel cell manufacturing method, is a block having a longitudinal dimension of 120 mm, a transverse dimension of 250 mm and a thickness of 30 mm, not including projecting portions of the intermediate adapter, and a weight of 700 g, which can be moved with a small force, allowing the handling by the robot without the fear of being damaged. Also, a fuel cell of 100 unit cell stack (corresponding to 10 kW) can be constructed simply by stacking ten of the unit blocks without the help of any additional jigs for positioning.

In this embodiment, the cell stack in match with the power generation scale can be formed simply by stacking the unit blocks of 10 unit cell which is easy in storing and transportation and not by staking the unit cells and the separator panels one by one, so that manufacturing efficiency and the cost can be significantly improved.

Also, the intermediate adapter can be used as an index for positioning of the stacking to form the unit block per several unit cells in which the position of each component parts of the stack is fixed can be formed, and the displacement of the stack can be eliminated because of the connection of the stack by the intermediate adapter, whereby the flexing of the stack due to the gravity when it is positioned laterally can be eliminated.

Also, in this embodiment, the intermediate adapter is made of polypropylene, the intermediate adapter serves as an electrical insulation, thus preventing the short-circuiting current flowing through the clamping shaft.

Fourth Embodiment

Figure 9:
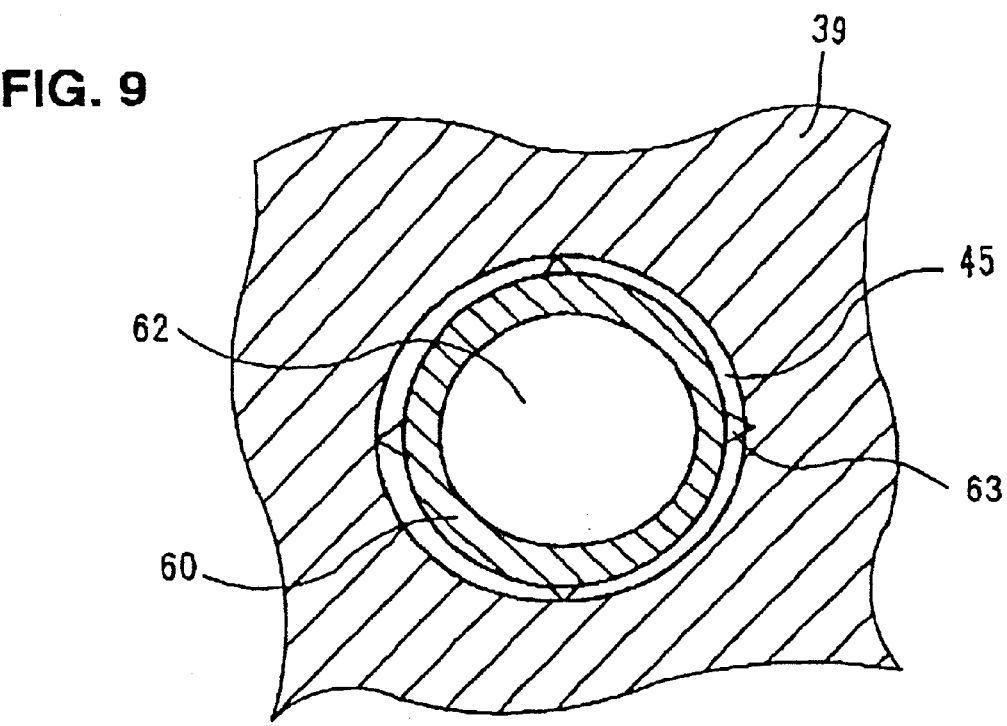
FIG. 9 is a fragmental sectional view of the separator panel showing the intermediate adapter of the fourth embodiment of the present invention inserted into the through hole of the separator panel.

In the third embodiment, a fuel cell was manufactured in a manner similar to that explained in the third embodiment except that the intermediate adapter 60 inserted into the through holes 45 was that illustrated in FIG. 9. FIG. 9 is a fragmental sectional View of the separator panel showing the state in which the intermediate adapter 60 is inserted into the through hole 45 of the separator panel used in the manner shown in the fourth embodiment and in which a portion of the upper surface is cut away, and the outer circumference of the intermediate adapter 60 nas formed thereon projections. The outer diameter of the intermediate adapter 60 is 12.5 mm and a clearance of 0.25 mm is provided. However, the projections 63 are provided at four directions and the outer circle diameter passing through tips of the projections is 13.2 mm which is slightly larger than the through hole 45.

In the third embodiment, when the dimensional accuracy is not stable when the unit block is manufactured, the separator panel and the unit cell are often difficult to fit, but in this embodiment, they can be easily inserted because there is a gap between the intermediate adapter 60 and the through hole 45.

Also, while the component parts at the end portions in the conventional design sometimes fell off from the unit block because of the presence of the large clearance, the projections 63 in this embodiment are brought into pressure contact with the through hole 45, so that they can be firmly secured. That is, the assembling is easy and the mechanical stability of the completed block can be improved.

It is to be noted that the projections may be disposed on the inner wall of the through hole 62 of the intermediate adapter.

Fifth Embodiment

Figure 10:
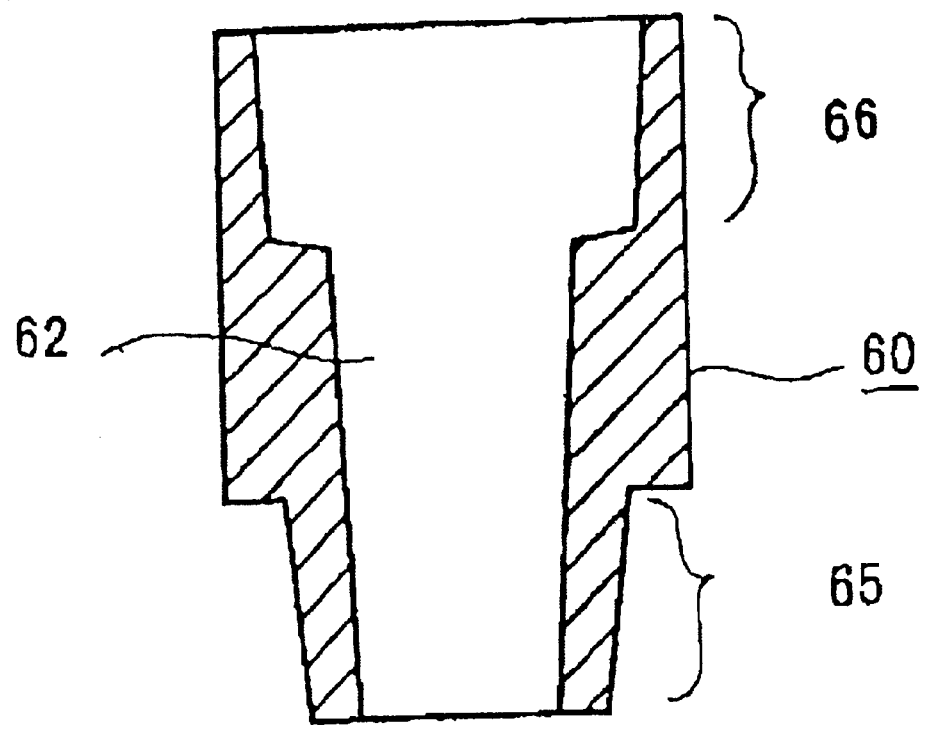
FIG. 10 is a sectional side view of the intermediate adapter of the fifth embodiment of the present invention.

The fuel cell may comprise the intermediate adapter 60 as illustrated in FIG. 10 with other structure similar to that of the third embodiment. FIG. 10 is a sectional side view of the intermediate adapter 60 used in this embodiment, the reference numerals 65 and 66 being overlapping portions for overlapping with the intermediate adapter of the adjacent unit blocks. The overlapping portions 65 has a diameter of 11.8 mm and the overlapping portion 66 has a diameter of 12 mm, whereby the thickness adjustment and the expansion and contracting during operation can be achieved by adjustably overlapping the projected intermediate adapters when the unit blocks are stacked.

Sixth Embodiment

Figure 11:
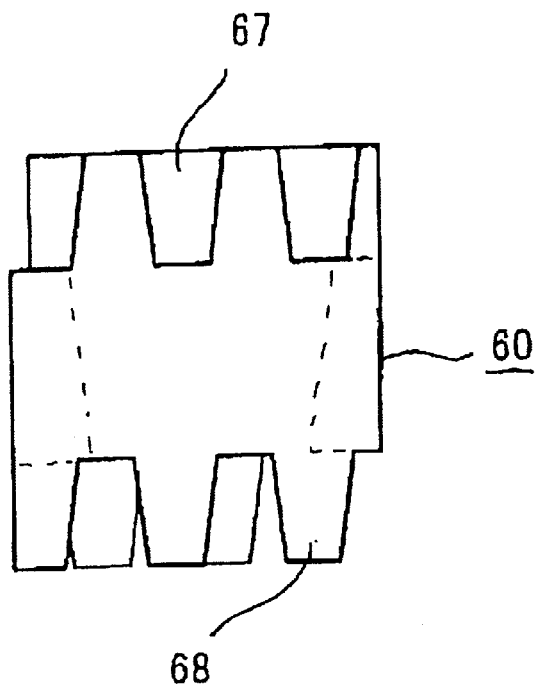
FIG. 11 is a schematic side view of the intermediate adapter of the sixth embodiment of the present invention.

The fuel cell may comprise the intermediate adapter 60 as illustrated in FIG. 11 with other structure similar to that of the third embodiment. FIG. 11 is a sectional side view of the intermediate adapter 60 used in this embodiment, the projection portion 68 and the recess portion 67 are provided on the overlapping portion at the end. The outer circumference of the projection portion 68 has the same diameter as that of the main body, so that even when the overlapping relationship between the intermediate adapters is changed due to the change in thickness of the stack, the circumscribing circle of the intermediate adapter is always at a constant position, thereby preventing the positional misalignment of the separator panel or unit cell at the overlapping portion (joint portion) when the stack is expanded and contracted.

Seventh Embodiment

Figure 12:
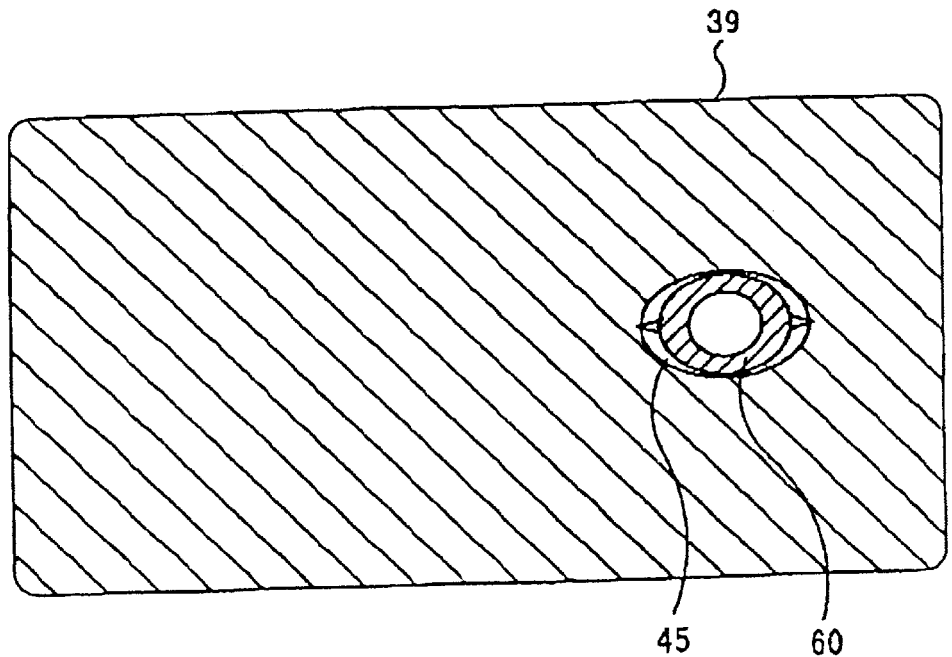
FIG. 12 is a schematic plan view of the unit block of the seventh embodiment of the present invention.

FIG. 12 is a sectional view of a separator panel 39 showing the through hole 45 has inserted therein the intermediate adapter 60. In other respects, the fuel cell of this embodiment has the structure identical to that of the fifth embodiment. It is seen that the intermediate adapter 60 and the through hole 45 of the separator panel 39 have cross sectional shape of an oval having a longer diameter of 15 mm and shorter diameter of 12 mm.

According to this embodiment, since the cross-sectional shapes of the intermediate adapter 60 and the through hole 45 are not circular but oval, the rotation of the stack or the rotation of the unit cell or separator panel about the intermediate adapter do not occur and This prevention of rotation as well as the translational displacement within the stack can be achieved by a single combination of the intermediate adapter and the through hole.

While the cross sectional shape of the intermediate adapter is oval in this embodiment, any non-circular shape such as a rectangle, a triangle and so on can equally be used.

Eighth Embodiment

Figure 13:
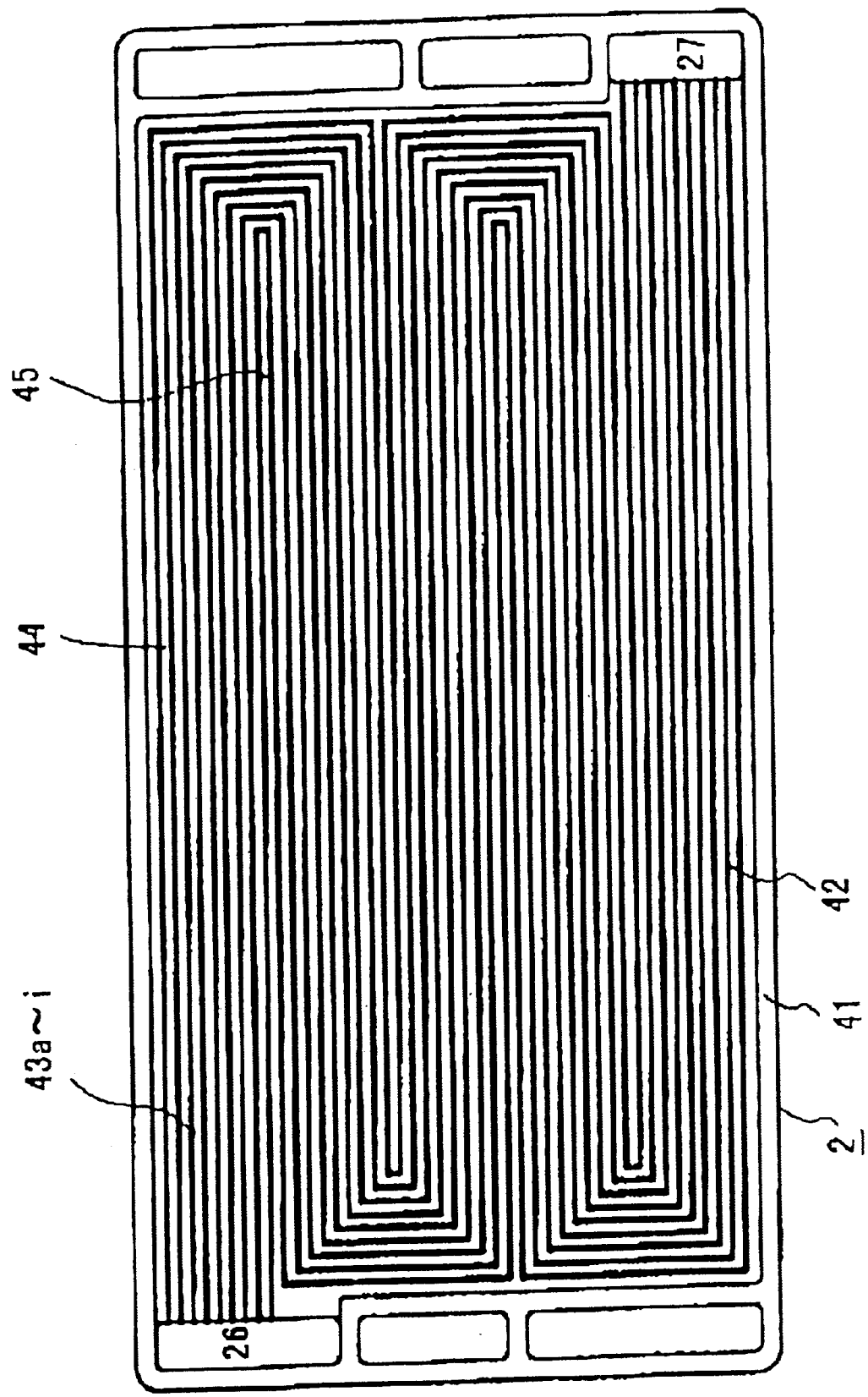
FIG. 13 is a plan view of the separator panel of the fuel cell of the eighth embodiment of the present invention showing the fuel flow paths.

FIG. 13 is a plan view of the separator panel for use in a fuel cell showing the fuel flow paths according to the eighth embodiment of the present invention, in which reference numeral 2 is a separator panel, 26 is a fuel supply port, 27 is a fuel discharge port, 41 is a main surface of the separator panel 2, 42 is an electrode support portion, 43$a$ to 43$i$ are parallel grooves for supplying fuel, which are fuel flow paths defining gas flow paths through which fuel flows when the unit cell is stacked, extending as a parallel fuel flow path group of 9 fuel flow paths, 44 are ridges or furrows between the grooves inside the parallel flow path group and 45 are ridges or furrows between the parallel flow path group which extend back and forth in the separator panel.

That is, 9 grooves extending from the fuel supply port 26 have a width of 1.2 mm and the ridges 44 between the grooves have a width of 1.0 mm. The width of ridges 45 between the parallel flow path groups extending back and forth have a width of 1.7 mm, which is 70% wider than the ridges inside of the parallel flow path groups.

Figure 15:
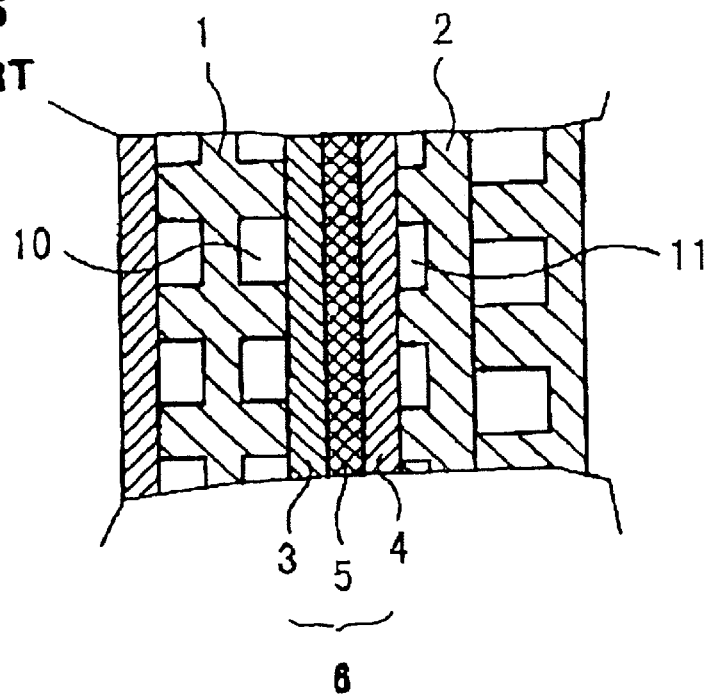
FIG. 15 is a sectional view for explaining the schematic structure of the unit cell of the conventional fuel cell.
Figure 16:
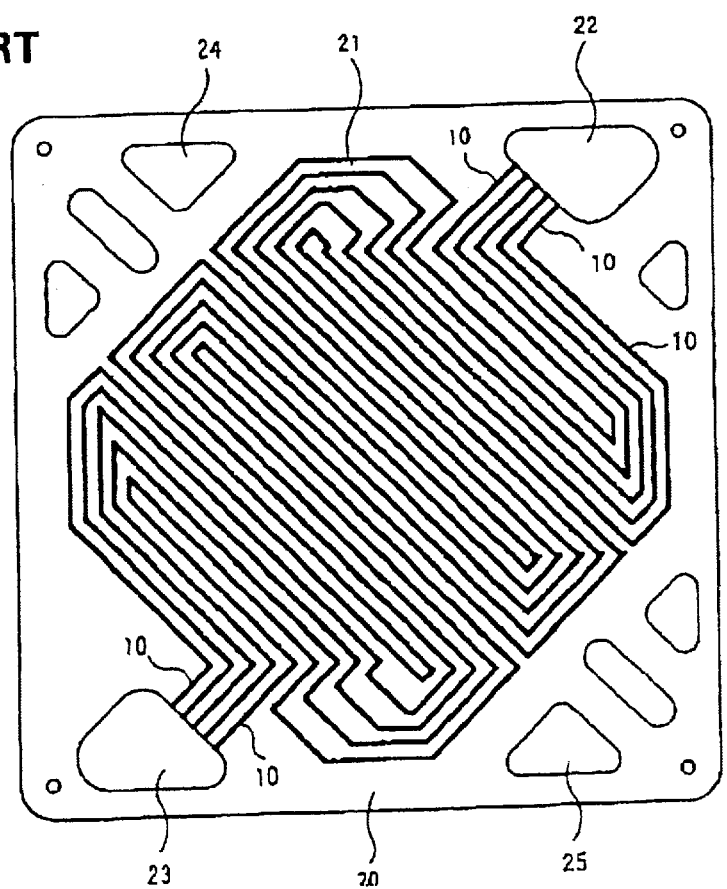
FIG. 16 is an explanatory view of the separator panel showing the top surface of the conventional fuel cell.
Figure 17:
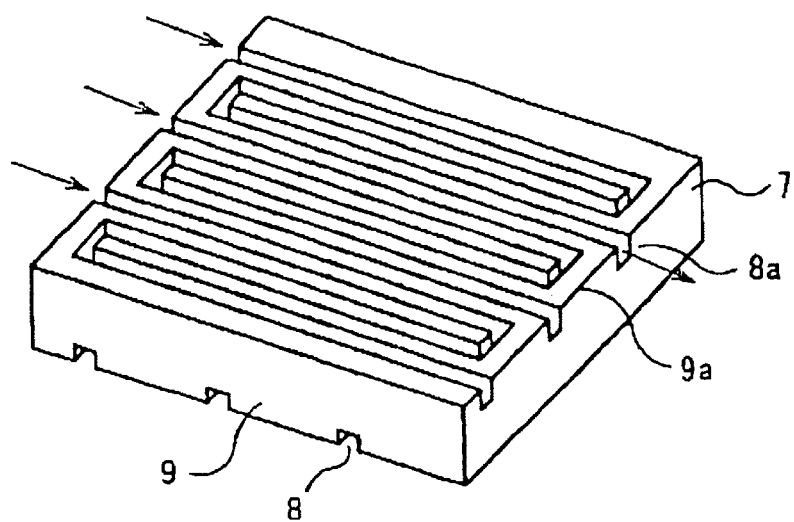
FIG. 17 is a perspective view of a conventional separator panel for showing the structure thereof.
Figure 18:
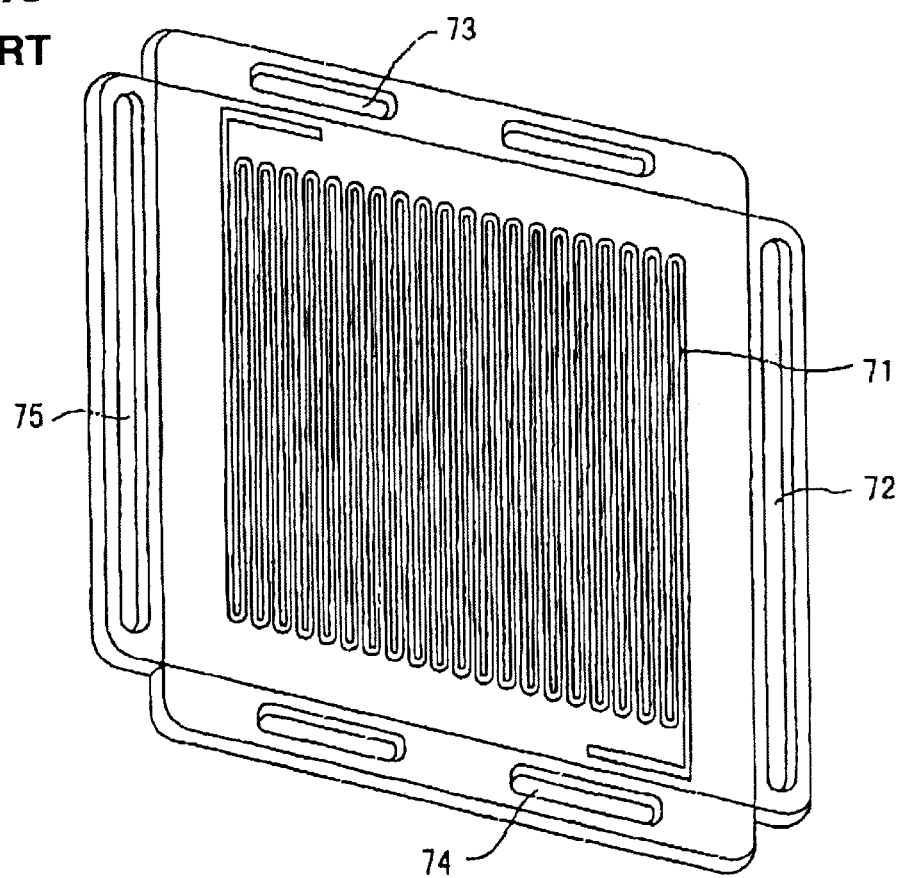
FIG. 18 is a perspective view of another conventional separator panel for showing the structure thereof.

The operation will now be described in conjunction with FIG. 15. The fuel cell is operated by supplying a methanol reformed gas (hydrogen 75%, carbon monoxide gas 25%) to the grooves of the parallel flow paths, then the fuel flowing through the fuel flow paths 11 reaches to the fuel electrode catalyst through the gas diffusion layer of the fuel electrode 4, generating the reaction of the chemical formula (1).

At this time, if the ridge width is too broad, the gas diffusion into the electrode portion corresponding to the central portion of the ridge is impeded, so that the ridge width of about 1 mm is suitable. However, this value is suitable when there is no gas pressure difference between the flow paths at the both sides of the ridge. When there is a gas pressure difference, or in other words, when the parallel flow path group extend back and forth and in the opposite directions, the amount of gas that does not flow through the grooves but flows through the gas diffusion layer in contact with the ridges increases. Therefore, when the width of the ridges 45 between the parallel flow path groups were made 1.0 mm that is equal to that of the ridges 44 within the parallel flow paths, then a portion in which the gas could not effectively used when the fuel utilization factor is increased to equal to or more than 80%, resulting in a rapid decrease in the characteristics. When the width of the ridges 45 between the parallel flow path groups were made 1.7 mm as in this embodiment, then the decrease in the characteristics is suppressed to only by 40 mV as compared to that when the fuel utilization factor is 75% even when the fuel utilization factor is increased to 82%, enabling that a high level characteristic can be maintained.

Ninth Embodiment

Figure 14:
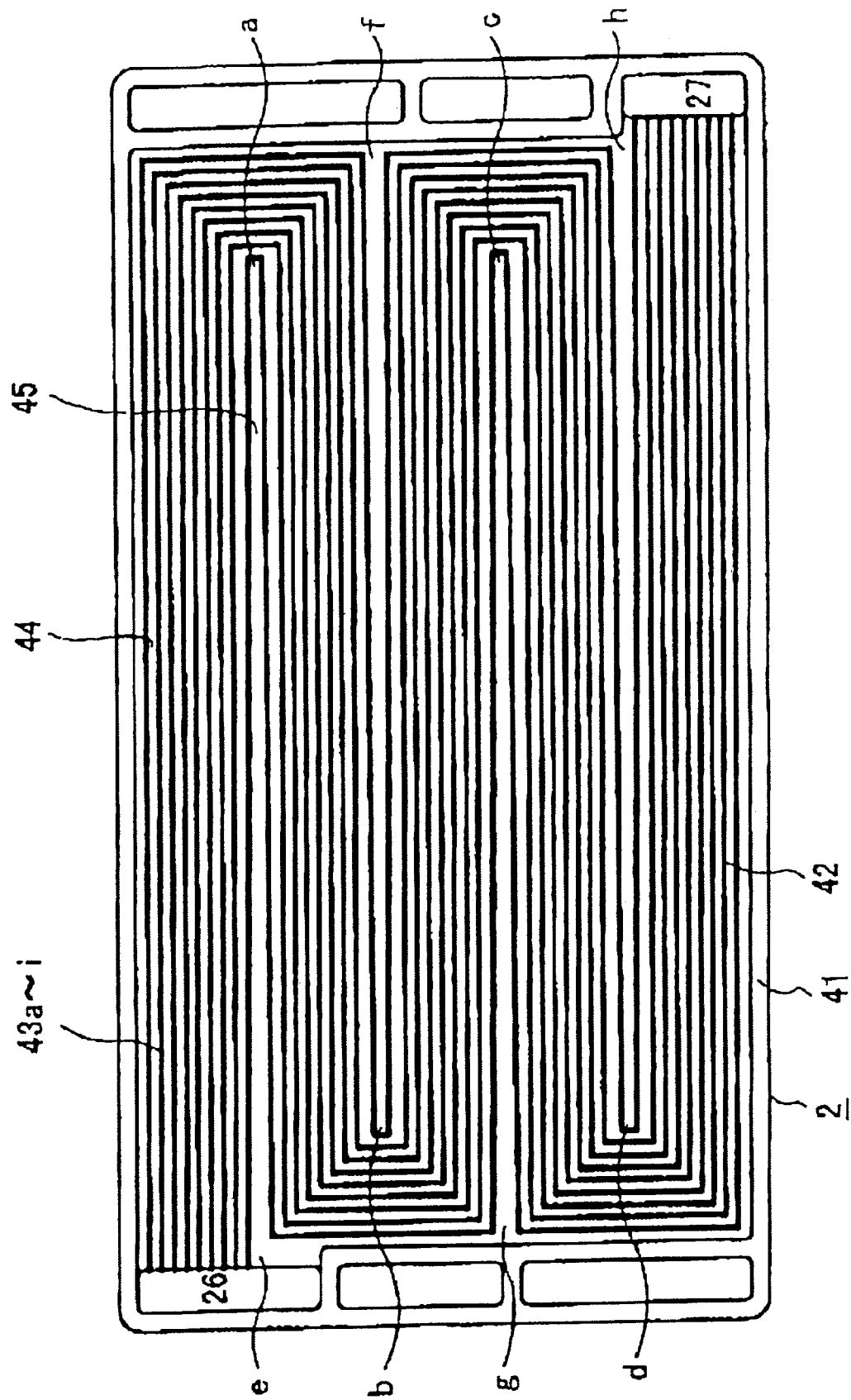
FIG. 14 is a plan view of the separator panel of the fuel cell of the ninth embodiment of the present invention showing the fuel flow paths.

FIG. 14 illustrates another separator panel of the fuel cell of the ninth embodiment of the present invention in which the ridges between the parallel flow path groups extending back and forth have the gradually changing ridge width so that the ridge width increases as the distance from the folded portion increases. In this embodiment, as shown in FIG. 14, the ridge 45 have a width at the folded portions a, b, c and d of 1.3 mm which is slightly broader than the ridge width of the ridges 44 between the parallel flow path groups and the widths at the opposite sides e, f, g and h are 2.0 mm, which is 1.3 to 2.0 times greater.

In this case, the fuel utilization factor can be increased up to 84%, making the characteristics stable and the fear of the fuel cell being damaged by the depletion of fuel due to the abrupt change in gas flow rate can be alleviated.

That is, the pressure difference between the neighboring grooves is proportional to the flow path length when the flow rate is constant. Therefore, while the pressure differences at the turns or the folded portions (a, b, c and d) are small, the pressure differences at the opposite sides (e, f, g and h) are at the largest, so that, in order to prevent gas slippage between the parallel flow path groups, it is effective to provide the ridge width of the ridges between the groups of the parallel flow paths with a taper as above discussed.

While the separator panel of the above embodiment is made of a thermoplastic resin containing carbon, a heat securing resin such as phenol resin can be equally used.

As has been described, according to the present invention, the fuel cell comprises a unit cell and a separator panel alternatingly stacked on one another, the unit cell having an electrolyte membrane sandwiched between a fuel electrode and an oxidant electrode, and the separator panel having a plurality of parallel fuel flow paths extending from a fluid supply port to fluid discharge port for supplying fluid fuel to the fuel electrode and a plurality of parallel oxidant flow paths extending from a fluid supply port to a fluid discharge for supplying oxidant fluid to the oxidant electrode, at least the plurality of oxidant flow paths including a plurality of groups of parallel flow paths, which extend back and forth within divided regions of the main surface of the separator panel, so that the fuel cell has a uniform reaction distribution over the separator panel and an improved performance.

The fuel cell comprises a unit cell and a separator panel alternatingly stacked on each other, the unit cell having an electrolyte membrane sandwiched between a fuel electrode and an oxidant electrode, and the separator panel having a plurality of parallel fuel flow paths extending from a fluid supply port to fluid discharge port for supplying fluid fuel to the fuel electrode and a plurality of parallel oxidant flow paths extending from a fluid supply port to a fluid discharge for supplying oxidant fluid to the oxidant electrode, at least the plurality of oxidant flow paths including a plurality of groups of parallel flow paths, positions along the plurality of groups of the parallel flow paths at equal distance from the respective fluid supply port thereof being distributed substantially evenly over the main surface of the separator panel, so that a fuel cell may have a uniform reaction distribution over the separator panel and an improved performance.

The separator panel may include a plurality of parallel coolant flow path for allowing a coolant to flow therethrough, and wherein the plurality of coolant flow paths including a plurality of groups of parallel flow paths, which extend back and forth within a region defined by a projection of the divided regions though which the oxidant flow paths extend, so that the temperature difference within the surface can be decreased and the cell resistance can be also decreased, thereby improving the characteristics.

Also, the method for manufacturing a fuel cell of the present invention comprises the step of preparing a unit cell having an electrolyte membrane sandwiched between a fuel electrode and an oxidant electrode and having a first through hole on an electrode surface, preparing a separator panel having a plurality of fuel flow paths extending for supplying fluid fuel to the fuel electrode and a plurality of oxidant flow paths for supplying oxidant fluid to the oxidant electrode and having a second through hole on a main surface thereof, stacking the unit cell and the separator panel one on another to make stacks, inserting an intermediate adapter having a third through hole into the first and second through holes to hold the stacks into unit blocks, stacking the plurality of unit blocks, inserting a clamp shaft into the third through hole of the intermediate adapter inserted into the stacked unit blocks to obtain a stack of the unit blocks, and then the stack of the unit blocks is clamped by the clamp shaft. Therefore, the fuel cell can be manufactured at low cost and high efficiency and the fuel cell can maintain a stable mechanical configuration during the operation.

The intermediate adapter may be a cylinder having an outer diameter for allowing it to be inserted into the first and second through holes, and the third through hole may have dimensions for allowing the shaft to extend therethrough, so that the fuel cell can be manufactured at low cost and high efficiency and the fuel cell can maintain a stable mechanical configuration during the operation.

The first and second through holes and the intermediate adapter may have an oval cross-sectional shape, so that the fuel cell can be manufactured at low cost and high efficiency and the fuel cell can maintain a stable mechanical configuration during the operation.

According to another aspect of the present invention, the fuel cell comprises a unit cell having an electrolyte membrane sandwiched between the fuel electrode and the oxidant electrode, a separator panel having formed therein fuel flow paths for supplying fuel fluid to the fuel electrode and oxidant flow paths for supplying oxidant fluid to the oxidant electrode, an intermediate adapter having a through hole therein and inserted into the unit cell and the separator panel to hold them in a stacked relationship to form unit blocks, and a clamp shaft extending through plurality of the unit blocks and clamping them into a stack of unit blocks. Therefore, the fuel cell can be manufactured at low cost and high efficiency and the fuel cell can maintain a stable mechanical configuration during the operation.

As has been described, the fuel cell of the present invention comprises a unit cell and a separator panel alternatingly stacked on one another. The unit cell has an electrolyte membrane sandwiched between a fuel electrode and an oxidant electrode, and the separator panel having a plurality of parallel fuel flow paths extending back and forth from a fluid supply port to fluid discharge port for supplying fluid fuel to the fuel electrode and a plurality of parallel oxidant flow paths extending back and forth from a fluid supply port to a fluid discharge port for supplying oxidant fluid to the oxidant electrode. The ridge width of ridges defined between grooves within the parallel flow path group is smaller than the ridge width of the ridges defined between the grooves of the parallel flow path group adjacent to each other. Therefore, the gas slips between a group of the flow paths and a second group of bent flow paths next to the first group of the flow paths are alleviated and the gas can be effectively utilized to realize a highly efficient operation.

The ridge width between the adjacent groups is increased as the distance from the folded portion increases, so that the gas slips between a group of the flow paths and a second group of bent folded paths next to the first group of the flow paths are further alleviated and the gas can be further effectively utilized to realize a highly efficient operation.

What is claimed is:
1. A fuel cell structure comprising:
 a unit cell and fuel and oxidant separator panels sandwiching said unit cell, said unit cell including an electrolyte membrane sandwiched between a fuel electrode and an oxidant electrode, said fuel separator panel contacting said fuel electrode and said oxidant separa- tor panel contacting said oxidant electrode so that a fuel supplied to the fuel electrode and an oxidant supplied to the oxidant electrode can react to produce electricity, wherein said fuel separator panel has a plurality of grooves, each pair of grooves being separated by a ridge, the grooves defining fuel flow paths extending from a fluid fuel supply port, for supplying fluid fuel to said fuel electrode, to a fluid fuel discharge port, said oxidant separator panel includes a plurality of oxidant flow paths extending from a fluid oxidant supply port, for supplying fluid oxidant to said oxidant electrode, to a fluid oxidant discharge port, and the grooves in said fuel separator panel extend in parallel within each of a plurality of groups, adjacent groups providing fluid flow paths in opposite directions and being separated by a separation ridge, said ridges between the grooves within each group being narrower than said separation ridges between adjacent groups.

2. The fuel cell structure as claimed in claim 1, wherein said separation ridges have respective widths between each pair of adjacent groups that change with position along said adjacent groups.

3. The fuel cell structure as claimed in claim 2, wherein each pair of adjacent groups are connected by a plurality of grooves in said fuel separator panel transverse to said adjacent groups and of said each of said separation ridges increases in width with distance from said grooves transverse to said adjacent groups.

4. The fuel cell structure as claimed in claim 1 wherein said separation ridges have a width more than 1.4 times the width of said ridges defining said grooves.

* * * * *